United States Patent
Hembury (10) Patent No.: US 8,332,095 B2
(45) Date of Patent: Dec. 11, 2012

(54) COMPUTER CONTROLLED SYSTEM AND METHOD FOR ENSURING ALL VEHICLES ENTERING AND/OR IN AN AREA ARE GPS LOCATION REGISTERED

(76) Inventor: Christine M. Hembury, Pittston, PA (US)

( * ) Notice: Subject to any disclaimer, the term of this patent is extended or adjusted under 35 U.S.C. 154(b) by 319 days.

(21) Appl. No.: 12/806,329

(22) Filed: Aug. 10, 2010

(65) Prior Publication Data

US 2011/0015971 A1    Jan. 20, 2011

Related U.S. Application Data

(63) Continuation-in-part of application No. 12/315,897, filed on Dec. 8, 2008, now Pat. No. 7,996,258.

(51) Int. Cl.
*G06Q 99/00* (2006.01)
(52) U.S. Cl. ............... 701/32.3; 701/29.1; 701/29.4; 701/29.6; 701/32.4; 701/29.2; 701/29.3
(58) Field of Classification Search .............. 701/32.3, 701/32.4, 29.1–29.4, 29.6
See application file for complete search history.

(56) References Cited

U.S. PATENT DOCUMENTS

| | | | |
|---|---|---|---|
| 5,657,008 A | 8/1997 | Bantli | 340/933 |
| 5,748,301 A | 5/1998 | Muller et al. | 356/155 |
| 5,898,391 A | 4/1999 | Jefferies et al. | 340/988 |
| 6,240,365 B1 | 5/2001 | Bunn | 701/213 |
| 6,285,931 B1 | 9/2001 | Hattori et al. | 701/29 |
| 6,298,306 B1 | 10/2001 | Suarez et al. | 701/213 |
| 6,448,889 B1 | 9/2002 | Hudson | 340/425.5 |
| 6,542,818 B1 | 4/2003 | Oesterling | 701/209 |
| 6,678,612 B1 | 1/2004 | Khawam | 701/213 |
| 6,717,527 B2 | 4/2004 | Simon | 340/825.36 |
| 6,718,263 B1 | 4/2004 | Glass et al. | 201/213 |
| 7,346,439 B2 | 3/2008 | Bodin | 701/36 |
| 7,358,857 B1 * | 4/2008 | White | 340/572.8 |
| 2004/0021579 A1 | 2/2004 | Oursler et al. | 340/870.07 |
| 2005/0071079 A1 | 3/2005 | Godfrey et al. | 701/207 |
| 2005/0088320 A1 * | 4/2005 | Kovach | 340/933 |
| 2006/0026017 A1 | 2/2006 | Walker | 705/1 |
| 2006/0212195 A1 | 9/2006 | Veith et al. | 701/35 |
| 2007/0697860 | 3/2007 | Arnold | 340/425.5 |
| 2008/0028038 A1 | 1/2008 | Kaplan | 709/217 |
| 2008/0133080 A1 | 6/2008 | Isaacs et al. | 701/33 |
| 2010/0188191 A1 * | 7/2010 | Martinez de Velasco Cortina et al. | 340/5.8 |

FOREIGN PATENT DOCUMENTS

| | | |
|---|---|---|
| KR | 10-0454189 B1 | 10/2004 |
| KR | 20-0404832 | 10/2005 |
| KR | 20-0412572 | 3/2006 |

* cited by examiner

*Primary Examiner* — Akiba Allen
(74) *Attorney, Agent, or Firm* — Michael F. Petock, Esq.; Petock & Petock, LLC.

(57) ABSTRACT

A computer system and method wherein each vehicle in a jurisdiction, as a result of a regular or temporary registration process when the vehicle enters a jurisdiction temporarily at a border point, has a GPS receiver and transmitter installed and transmitting to a storage which stores for each vehicle identification code the location data and time An alarm detection system detects either loss of signal or tampering. A monitoring system also detects moving vehicles in an area, and positions reported by the monitoring means are compared with information being recorded on the computer system, and if these do not correlate, an unregistered vehicle alarm is generated. The system may be limited to vehicles entering at a border point, or new vehicles with GPS receivers and wireless transmitters installed at the time of manufacture.

55 Claims, 3 Drawing Sheets

COMPUTER CONTROLLED SYSTEM AND METHOD FOR ENSURING ALL VEHICLES ENTERING AND/OR IN AN AREA ARE GPS LOCATION REGISTERED

CROSS REFERENCE TO RELATED APPLICATION

This application is a continuation-in-part of application Ser. No. 12/315,897 filed Dec. 8, 2008 now U.S. Pat. No. 7,996,258 by the inventor herein entitled Computer System And Method For Statewide Or Other Jurisdiction Registering And Monitoring Of Vehicle Locations and Applicant claims the benefit of the earlier filing date for so much as is common in these two applications. Applicant incorporates by reference the entirety of the aforesaid parent application the same as if set forth at length herein.

FIELD OF THE INVENTION

The present invention relates to a computer system and method for statewide or other jurisdiction registering and monitoring of vehicle locations. The term jurisdiction herein means an entire country, state, county, city or a limited area which may be defined such as (1) a strip along a border of a preselected width which may vary, be uniform or be an irregular shaped strip adjacent a border of a state or a country or (2) a predefined or predetermined area around a sensitive site of any shape, regular or irregular. More particularly, the present invention is directed to a computer system and method wherein substantially all vehicles in a jurisdiction may be registered or all vehicles of a particular type, such as new vehicles or vehicles entering into a jurisdiction at a border point assigned a vehicle identification code and provided with a global positioning receiver and wireless transmitter wherein the position of the vehicles at all times would be transmitted back to a government computer system and recorded in real time for access by authorized users. The present invention may be directed to a limited system wherein only vehicles entering at a border point are registered, or only new vehicles with GPS receivers and wireless transmitters installed at the time of manufacture or a preferred combined system wherein all vehicles in a jurisdiction are registered. Any combination of these systems may be utilized in practicing the present invention. The present invention also includes means for detecting unregistered moving vehicles located in a jurisdiction.

BACKGROUND OF THE INVENTION

Presently across the nation, there are frequent high speed chases by police to catch a perpetrator or suspected perpetrator of a crime. These high speed chases are dangerous to the police officers and even more dangerous to the unsuspecting public traveling along the roadways. There is a need to reduce the number of high speed police chases which result in numerous injuries each year to innocent members of the public, police officers and others.

Additionally, there are numerous traffic crimes each year which go unrecognized and uncontrolled because of the inability of law enforcement to monitor violations such as speeding, violation of stop signs and other violations. A more effective law enforcement in this area is needed.

Additionally, when there is an emergency in an area, it is often difficult to know which vehicles are located in the area. All of these vehicles may need assistance to protect lives and property. At present, the only way to know what vehicles may be in the area is if there are witnesses to provide such data to emergency personnel.

Further, when a crime is committed, whether it be a murder, burglary, robbery, rape or other serious crime, there is no way of ascertaining what vehicles may have been in the area at the time of the crime in the absence of an eye witness who is able and willing to identify the vehicle and report it to law enforcement. Further, it is often very expensive for law enforcement to track down such information. There is a need for a better approach in this area.

When there is a traffic accident, it is often desirable to determine what happened and who is financially responsible for the accident. At present, this is often a very time consuming and expensive procedure often times involving litigation, including discovery in the form of depositions and other discovery, and sometimes a court trial.

It is a severe problem in the United States and possibly other countries wherein there is an inability to keep the borders secure from unauthorized people crossing them and then relocating within the jurisdiction. Presently in states like New Mexico, there is a large influx of Foreign Nationals illegally crossing the border on foot where they go what are called stash houses and are then later picked up from the stash houses and transported by vans to other areas. Often the border areas are barren areas of land with large open expanses.

Currently, there is also a problem with sensitive sites, such as nuclear power plants which could cause severe irreparable damage to large areas of a jurisdiction if they were driven into by a truck loaded with explosives. Presently, there is no way of monitoring any vehicle movement outside of the fenced areas of the immediate area of the sensitive site, such as the nuclear power plant.

In recent years, the United States Department of Defense developed a global positioning system officially known as NAVSTAR-GPS and usually referred to as GPS. GPS utilizes a constellation of approximately twenty four to thirty two medium earth orbit satellites that transmit precise microwave signals. This enables GPS receivers to determine the location of the GPS receiver at any particular time.

SUMMARY OF THE INVENTION

An advantage of the present invention is that it will reduce the need for high speed chases by police to catch a perpetrator or suspected perpetrator of a crime as the location of a vehicle will be readily and instantaneously available to law enforcement. This will enable the placement of effective road blocks reducing the need for high speed chases. This will reduce the instances of injury to innocent members of the public, police officers and others.

Another advantage of the present invention is that it will allow law enforcement to more effectively enforce traffic laws by being able to monitor instantaneously and for a specified period of time into the past the movement of vehicles.

Another advantage of the present invention is that it will allow law enforcement to identify vehicles in a location of interest at a particular time, not only presently, but for a specified period of time in the past.

Another advantage of the present invention is that it will provide the location of particular vehicles at a particular time in the past and at a plurality of times in the past, which may be closely related, enabling accident reconstruction and other efforts at determining who is financially responsible for an accident.

Another advantage of the present invention is that it will enable law enforcement and other government agencies to monitor vehicles entering into sensitive areas such as areas near nuclear power plants, to enable terrorism prevention and/or other acts of sabotage.

Another advantage of the present invention, is that it would be a significant aid in solving hit and run accidents.

Another advantage of the present invention, is that it would be a significant aid in the managing of emergencies and may improve recovery efforts more rapidly during natural disasters such as hurricanes, tornadoes, floods, snow storms and the like.

Another advantage of the present invention is that it would enable suspected perpetrators of a crime to be stopped by a well placed road block based upon information from the present invention rather than a high speed chase.

Another advantage of the present invention is that it may decrease the cost and time expended on performing statistical research for determining data such as how many vehicles pass on a particular roadway each day.

Another advantage of the present invention, particularly in border states, is that Homeland Security could require the installation of a temporary GPS receiver and transmitter be hooked into the system of the present invention when a vehicle enters into the state or jurisdiction, thereby being able to effectively track the vehicle and minimize the threat of terroristic acts. These temporary tags could be placed on all motor vehicles entering the jurisdiction, such as cars, trucks, buses, motorcycles, all terrain vehicles and boats.

Another advantage of the present invention is that the data comprising the location of a registered vehicle could be maintained for a specified period of time such as twelve months or such longer or shorter time as may be desired by the particular state or other jurisdiction. After the predetermined time period of memory storage is reached, such as twelve months, data relating to the location of the vehicle more than twelve months old could be purged.

Another advantage of the present invention is that in accident reconstruction, data would be available continuously for the last twelve months thereby enabling accident reconstruction to determine how fast each driver was driving and who may be at fault because of the ability to retrieve the recorded time correlated position of the vehicles. This may reduce the time and expense spent on litigation, insurance claims or fraud. It may be possible for insurance companies to defray some of the administrative cost of the system as they could be a major beneficiary as a result of reducing the cost of claim determination.

Another advantage of the present invention is that teenagers and/or inexperienced drivers may be assigned a vehicle identification code which indicates their driving status. This would enable law enforcement to document and review speed, curfew compliance and the whereabouts of inexperienced young drivers in an attempt to reduce accidents and fatalities.

This information could be shared with insurance companies for risk assessment purposes and the insurance companies may pay a fee to defray the cost of maintaining the system.

Another advantage of the present invention is that it would provide a means for law enforcement to continuously track the whereabouts of vehicles of sex offenders, particularly in relation to schools, playgrounds and other places frequented by minors.

Another advantage of the present invention is that the system of the present invention may be used in conjunction with a GPS receiver already installed in a vehicle thereby reducing the cost of initial installation in particular vehicles having a GPS receiver already installed.

Another advantage of the present invention is that the cost of initially registering and outfitting a vehicle with a GPS receiver and a wireless transmitter may be reduced by utilizing a modified process of registering vehicles which are manufactured with a GPS receiver and wireless transmitter installed at the time of manufacturer.

Another advantage of the present invention is that jurisdictions of limited area may be established for monitoring without involving an entire state or other larger jurisdiction by defining an area such as (1) a strip of land, for example ten or twenty miles wide along a border or (2) a jurisdiction defined as a fixed or varying radius around a sensitive facility, such as a nuclear power plant. Both the strip and the area around a sensitive faculty may take any shape.

Another advantage of the present invention is that it will enable more effective policing and control of borders, particularly with respect to the tracking of vehicles which may pick up illegal immigrants or others illegally crossing a border.

Briefly and basically, in accordance with the present invention, a computer system is provided which comprises a means for inputting into a computer an application for registration for substantially each vehicle of a particular type in a jurisdiction or each in a jurisdiction or each vehicle in a jurisdiction. In one embodiment of the present invention, substantially each vehicle in a jurisdiction may mean each vehicle entering into a defined jurisdiction at a border point. In another embodiment, the present invention may include means for registering a vehicle wherein the vehicle is supplied at the time of manufacture with a GPS receiver and a wireless transmitter, thereby eliminating the cost of supplying the equipment and installation costs at the time of registration. In another embodiment, substantially all vehicles of all types would be registered. This would include those entering at a border point, newly manufactured vehicles with the GPS and wireless transmitter thereon and all other vehicles within the jurisdiction. This is a preferred embodiment. Means are provided for processing each application and notifying each applicant to present each vehicle for which registration was applied to an inspection/installation facility. In the case of a system utilizing registration of vehicles entering into a jurisdiction at a border point, the vehicle may already be at the inspection/installation facility at the border point and is merely presented for the installation and testing for operability of the equipment. In the case of vehicles manufactured new with a GPS receiver and wireless transmitter, the vehicle may be at the inspection/installation facility where the vehicle is being put into service, such as a new car or new vehicle dealership and the registration process is completed by correlating a vehicle identification code with the new car or vehicle with the GPS receiver and transmitter installed being placed into service. In a preferred embodiment, the computer system would accommodate registration of all vehicles in a jurisdiction including those entering at a border point and new vehicles manufactured with a GPS installed receiver and wireless transmitter. However, the computer system may be utilized solely for a limited jurisdiction or defined jurisdiction, such as a strip of land along a border or around a sensitive site, or one for newly manufactured vehicles only as a phase in system over a period of years until all vehicles in the jurisdiction are registered. The inputting of the application into the computer system may be by an applicant for registration or inspection or may be done automatically by a computer process at the renewal time each year once a vehicle has been registered. The computer system further includes means for notifying at least one of a plurality of vehicle/inspection installation facilities of a vehicle identification code for each vehicle for which registration was applied for. The computer system further includes means for inputting data from an inspection/installation facility when a GPS receiver with a wireless transmitter has been installed on the vehicle for which registration was applied and is operating properly.

Means are provided for receiving from each wireless transmitter information in the form of a vehicle identification code and current location information. Means are provided for storing the vehicle information code and location information relating to that vehicle information code in real time in a memory for a predetermined period of time, which for example may be twelve months, six months, two years or any other suitable time period. In other words, for each vehicle, the vehicle identification code would be recorded with the location data and time recorded continuously as it occurs in real time or substantially in real time. For each vehicle identified by the vehicle identification code, time and location data would be continuously recorded.

Means are further provided for inputting into the computer selectively a request for location information for a particular time or times from an authorized user. Means are also provided for processing the inputted request for information and providing a response to the authorized user in response to the request.

In a presently preferred embodiment, each vehicle registered in a jurisdiction and each vehicle entering a jurisdiction through a border point or as a new vehicle would have an application inputted into the computer for the issuance of a GPS receiver with a wireless transmitter having a vehicle identification code for transmission of location data connected to the vehicle identification code to the central computer. However, as described above, more limited systems may be used in accordance with the present invention, such as a system which only registers new vehicles or vehicles entering into a jurisdiction at a border point, which may be a limited jurisdictional area such as a strip along a border or a defined area around a sensitive site.

Briefly and basically, in accordance with the method of the present invention, a method is provided of inputting into a computer one of a plurality of applications for registration of a vehicle entering a jurisdiction at a border point. The method further includes the step of processing by the computer the application and notifying an applicant to present the vehicle for which registration was applied to an inspection/installation facility. The method further includes a step of notifying at least the inspection/installation facility at the border point when the application was made, as one of a plurality of vehicle inspection/installation facilities, of a vehicle identification code for the registration applied for vehicle. The method includes the step of inputting data into the computer from an inspection/installation facility when a GPS receiver and wireless transmitter has been installed on the vehicle for which registration was applied for. The method further includes the step of providing a memory in the computer for storing data related to the location of the vehicle identified by the vehicle identification vehicle code and storing in substantially real time in the memory the time and location for the vehicle identification code for a predetermined period of time.

The method further includes the step of inputting selectively a request for vehicle location information or particular times from an authorized user and processing the inputted request for information and providing a response to the authorized user in response to the request. The method further includes the steps of repeating the aforesaid steps of inputting an application, processing, notifying, inputting data and storing for substantially all vehicles registered in a jurisdiction.

Additionally, in accordance with the method of the present invention, in a preferred embodiment of the invention, not only would vehicles entering a jurisdiction at a border point and obtaining what usually would be a temporary registration for the period of time that it intends to be in the jurisdiction, but that all vehicles required to be registered in a jurisdiction would be registered.

A further preferred embodiment of the present invention would include a method wherein there is monitoring of vehicles by electronic means in a predetermined area, such as in an area along a border or around a sensitive site, and determining their location. This monitoring means may be radar or other sensors for sensing vehicles, such as sensors embedded in roadways, on poles or other structures along roadways. The location of the vehicles would be determined either by the known location of the sensor or, in the case of radar, by the range (distance from the radar) and azimuth (angle) information with respect to the radar antenna produced by the radar. This information relating to a vehicle being located at a location would be compared to information being stored in the computer and if the computer stored information did not indicate a vehicle at that location, an alarm would be generated indicating that there is an unregistered vehicle in the jurisdiction at the location determined by the monitoring means. This could then alert law enforcement to approach the vehicle and determine the status of the vehicle.

In a particular embodiment, the authorized users would include law enforcement and emergency services personnel.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
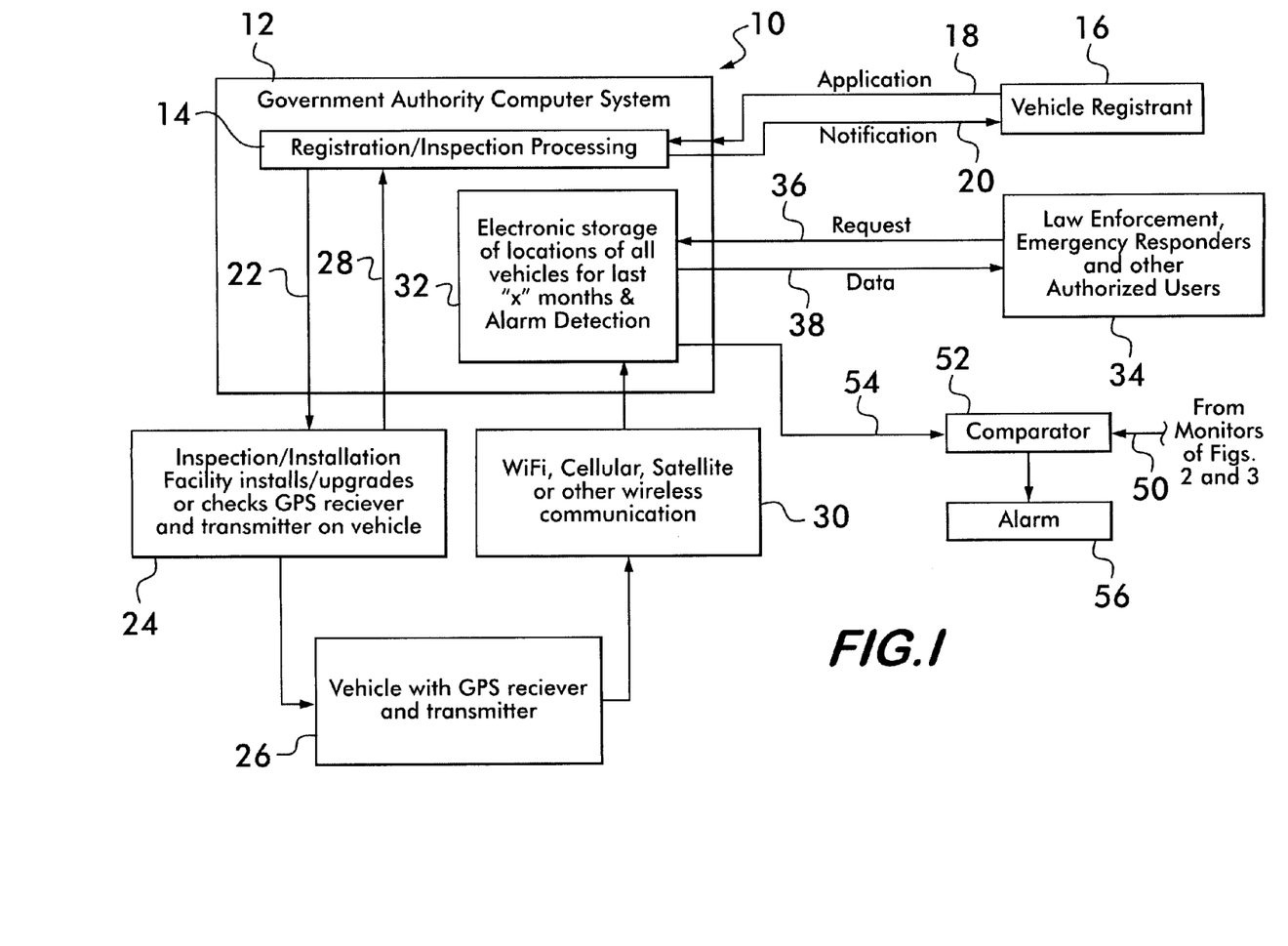
FIG. 1 is a block diagram of a computer system for state-wide or other jurisdiction registration and monitoring of vehicle locations and which also illustrates the method.

Referring now to the drawings, there is shown in FIG. 1 a system 10 for registering all vehicles of a particular type such as those entering at a border point or new vehicles and/or substantially all of the vehicles in a state or other jurisdiction, assigning a vehicle identification code ("VIC") which maybe correlated to a license plate of a vehicle and or vehicle identification number ("VIN"), installing on the vehicle a global positioning system (GPS) receiver and a wireless transmitter on each registered vehicle wherein the vehicle with the GPS receiver continuously transmits via a wireless system location or position information for each instant of time of the vehicle correlated with the vehicle identification code for storage for a predetermined period of time, such as twelve months. Jurisdiction herein may mean a state, county, city or a more limited area such as a defined area around a sensitive site, such as a nuclear power plant or a strip of land along a border which may be ten, twenty or some other selected distance X miles wide or vary in width. The defined jurisdiction area need not be uniform such as a uniform width of a strip of land, but may be irregular in shape and may vary depending upon terrain and or other characteristics, such as rivers, lakes and the like. Also, although a predefined area around a sensitive site may most easily be defined by a radius around the site, other shapes of jurisdictional areas may be utilized.

The system or computer may be designed to receive only applications for vehicles entering into a jurisdiction at a border point, such as vehicles being temporarily registered where they are entering a jurisdiction and anticipate being within the jurisdiction for only a limited period of time which may be days, weeks or months. This makes tracking of the whereabouts of such visitors within a jurisdiction much more feasible and readily locates the vehicle when their visitation rights or visa expires. The border point registration may be for longer periods, such as one or two years and may be considered not to be temporary. The computer and system may be designed solely for the registration of vehicles entering at a border point. However, in a preferred embodiment, all vehicles within a jurisdiction would be registered including those entering at a border point on a permanent or temporary basis. The system or computer may also process applications for new vehicles manufactured with a GPS receiver and wireless transmitter installed at the time of manufacture of the vehicle. Such a system may be included as a part of a system which registers all vehicles in a jurisdiction or, may be utilized as a phase-in in a particular jurisdiction wherein in the beginning only new vehicles would be registered which come with preinstalled, at the time of manufacture, GPS receivers and wireless transmitters adapted to work with the system. In the case of new vehicles with GPS receivers and wireless transmitters installed at the time of manufacture, the new car or new vehicle dealer may process the application to register the vehicle with the system and test it to ensure that it is operating successfully to transmit the VIC and the vehicle location on the government authority computer system. In such a system, the vehicle identification code established for the new vehicle may be the VIN number, but preferably would be a new number assigned by the government authority computer system which would generate its own convenient series of VIC or vehicle identification codes.

The system further includes the ability to apply for registration and for notification of the Applicant to present or take the vehicle to an inspection/installation facility for the installation, confirmation of operability of a previously installed or upgrading of a GPS receiver and transmitter and to insure proper operation. As discussed above, in the case where registration or temporary registration is being applied for at a border point, the vehicle would most likely be already at an inspection/installation facility and the operator of the vehicle would merely present the vehicle to the inspection/installation facility for installation of the GPS receiver and wireless transmitter and confirmation of its proper operability. Also, in the case of newly manufactured vehicles having a GPS receiver and wireless transmitter installed at the time of manufacture of the vehicle, the vehicle would most likely be at an inspection/installation facility located at the new vehicle dealership where it is being processed for placement into use such as is currently done with the installation of new license plates and the like at the time of a sale of a new vehicle and the placing of it into operation by a new owner having acquired it from a dealer.

The system further includes means for law enforcement, emergency responders and other authorized users to access the electronically stored information keyed to the vehicle identification code for data relating to the vehicle's position at any particular time and for a predetermined period of time in the past such as the previous twelve months.

The GPS receiver on the vehicle may be provided with a tampering device that if the GPS receiver is removed or disabled, an alarm is sent via the transmitter and activates an alarm at the computer 12. This alarm which may be referred to as a tampering alarm may alternatively be generated by unit 32 in the government authority computer system detecting a discontinuation or loss of signal from any particular vehicle.

More specifically, the government authority computer system or computer 12 may be a centrally located computer or components spread around the state or jurisdiction and interconnected by various known computer links including, but not limited to, microwave links, high speed data lines and/or the internet. Computer 12 includes a registration/inspection processing sub-system to which applications from vehicle registrant 16 are received as shown by line 18. An application would have to be inputted via line 18 when a vehicle, particularly a new or preowned vehicle is purchased or a vehicle is temporarily brought into a jurisdiction such as at a border point. This inputting and all of the other inputting described herein may be any suitable means of inputting data to a computer or computer system as is presently known and as may be developed. An application may also be required to be submitted at periodic intervals, such as yearly or some other selected time period. However, an application may not need to be submitted periodically, but may be at least partially generated or initiated by the government authority computer system 10 wherein previously registered vehicles are automatically issued a notification via line 20 to take their vehicle to an inspection/installation facility to have their GPS receiver and transmitter updated and/or checked and verified, along with any other inspection requirements for the particular state or jurisdiction. The vehicle owner or lessee may have to complete the application by inputting data via line 18 in FIG. 1.

Substantially simultaneously with the approval of the application and notification to vehicle registrant to take or present the vehicle to an inspection/installation facility or shortly thereafter, the registration/inspection processing sub-system 14 may assign a vehicle identification code to the vehicle for which registration has been applied for. The vehicle identification code may be any suitable code generated by registration/inspection processing sub-system 14 or it may be the vehicle identification number (VIN), the license plate number, or any other suitable code. The vehicle identification code is transmitted or sent to inspection/installation facility 24 via line 22. Simultaneously with the transmission of the vehicle identification code via line 22, other appropriate information is sent to the inspection/installation facility 24 to enable the inspection/installation facility 24 to properly code a GPS receiver to be correlated with the vehicle identification code VIC for the particular vehicle for which registration was applied for.

Inspection/installation facility 24 in the case of a vehicle registration for a vehicle not previously registered or one entering at a border point would install a GPS receiver and a wireless transmitter on the vehicle 26 identified by the government authority computer system 12. The GPS receiver or transmitter would be provided with the vehicle identification code provided from the government authority computer system 12 (although the government authority computer system 12 may have adopted the VIN or code supplied by a manufacturer) for transmission of the code with the location information, especially if the vehicle is one supplied with a GPS receiver and wireless transmitter at the time of manufacture. Inspection/installation facility 24 would also check that the vehicle GPS receiver and transmitter are working properly (for newly installed receivers and transmitters and for ones previously installed), properly transmitting the vehicle identification code and location data via the wireless transmitter. When the inspection/installation facility 24 successfully installs the GPS receiver and transmitter, and the GPS receiver is working properly and the transmitter is transmitting the location data along with the vehicle identification code via the wireless transmitter, means is provided for inputting data to computer system 12, such as by a wireless network, data line or other means indicated by line 28, that the inspection/installation facility has successfully installed the GPS receiver with the wireless transmitter on the vehicle for which registration was applied for and is operating properly. In the case where new vehicles have a GPS receiver and a wireless transmitter installed at the time of manufacture, an application may be inputted via Line 18 of FIG. 1 with the information that the GPS receiver and the wireless transmitter are already installed and there is communication with respect to the assignment of a VIC. The VIC may be generated by the government authority computer 12 and sent to the dealer or depending upon desired operation of the system, the dealer may transmit information as to the VIN to the government computer which will adopt that as the VIC. In either case, the inspection/installation facility at the dealer would transmit back to registration/inspection processing 14 the end result that the new vehicle is being placed in the service to a particular owner or lessee with a VIC and operating GPS receiver and wireless transmitter.

In cases where vehicle 26 already has a GPS receiver and wireless transmitter and is already transmitting the vehicle identification code and location data such as in the case where a vehicle was previously registered and processed in the state or jurisdiction, the inspection/installation facility may merely need to verify that the system is properly installed and operational and transmit this confirmation via line 28 back to the registration/inspection processing sub-system 14 of the government authority computer system 12. The system may operate in several ways, including, but not limited to: (1) a new GPS receiver and wireless transmitter are installed periodically, such as yearly, (2) a new GPS receiver and wireless transmitter are only installed when there is a change in equipment such as an equipment upgrade or (3) vehicles with already installed operational GPS receivers and wireless transmitters properly transmitting the proper vehicle identification code to the government authority computer system 12 need not be changed, but only verified to the government authority computer system that the system is in fact operating properly.

The wireless transmitter on vehicle 26 transmits the GPS location data and the vehicle identification code information via a wireless communication network such as WiFi, cellular network, satellite communication or other wireless communication as shown by block 30. The vehicle identification code and continuous position or location data is transmitted to an electronic storage sub-system 32 in the government authority computer system 12. In this manner there is a continuous transmission by the wireless transmitter on vehicle 26 of its location along with the vehicle identification code which is carried over wireless communication network 30 and electronically stored in electronic storage sub unit 32. Electronic storage sub-system 32 may store this continuous data for each vehicle for a predetermined period of time such as one month, six months, one year, two years or whatever period of time may be desired. Once data is older than the prescribed storage time period, such as one year, the data is purged from the system and the memory may be reused. The information stored may be stored in real time or substantially in real time. This information will include for each vehicle the vehicle identification code, the time and location of the vehicle identified by the vehicle identification code. In other words, an electronic storage system subsystem 32 would store in real time or substantially in real time for each vehicle identification code the location at each instant in time. This stored data may then be accessed at any time during the predetermined period of time for which it is stored, such as a twelve month period, until it is purged. In other words, during that period the location of the vehicle may be pinpointed at any instant in time and its movements and locations may be revealed or documented during any particular time period within a predetermined period of time for which it is stored, such as a twelve month period.

Vehicle 26 may be provided with a detection system for detecting the removal or tampering with of the GPS receiver or the vehicle code. This would cause the sending of an alarm signal via the transmitter to electronic storage sub-system 32 which contains an alarm detection circuit or software. This alarm detection would then trigger an alarm in the government authority computer system which would enable government authorities to take appropriate action to correct the condition. Additionally or alternatively, the alarm detection circuit in subsystem 32 may include a circuit for detecting the loss of signal from a vehicle and energizing an alarm. In this manner, disabling of the transmitter still generates an alarm signal.

The system and method described so far may be utilized to register all or substantially all of the vehicles in a jurisdiction, all vehicles entering a jurisdiction at a border point and/or all new vehicles with a GPS receiver and wireless transmitter installed at the time of manufacture. In a presently preferred embodiment all vehicles registered in a jurisdiction would be required to apply for registration and have a vehicle identification code assigned, a GPS receiver and wireless transmitter installed and have their location monitored. The assigning of a vehicle identification code by the government computer includes adoption by the government computers 12 of a code suggested by the applicant such as the VIN of the vehicle. However, it may be a necessity to have certain vehicles exempted from the system, such as Central Intelligence Agency vehicles, presidential vehicles or other highly sensitive vehicles for which it would not be desirable to monitor and record their movements. As a practical approach, politically and financially, it may be necessary to phase in the system, such as initially only vehicles entering at a border point or only new vehicles with the GPS receiver and wireless transmitter installed by the manufacturer of the vehicle or his designee at or around the time of manufacture. Throughout, it is understood that reference to a vehicle manufactured with a GPS receiver and wireless transmitter installed by the manufacturer includes a situation where a manufacturer may elect to have this work done be a third party such as a subcontractor or a components manufacturer.

With the monitoring and recording of the location of all or substantially all of the vehicles registered in a jurisdiction, with the location for each vehicle identification code being stored and retrievable for a period of time such as twelve months, an advantage of the invention of at least partially cross checking to see that all vehicles are registered as set forth above may be achieved. As will be described more particularly with respect to FIGS. 2 and 3, where substantially all of the vehicles in a jurisdiction are registered, a system of monitoring within the jurisdiction or within a particular protected area may be provided to detect vehicles and particularly moving vehicles by various monitoring means such as radar and other sensors, such as sensors activated by tires running over them or sensors mounted on poles or other structures along roadways. The other structures may be built for this purpose or may be pre-existing, such as bridges and toll booths. Information is produced by the monitoring system (radar and other sensors) that a vehicle has been detected at a particular location within the area. This vehicle location or position information produced by the monitoring system is compared with data stored (data stored includes by definition herein information which is currently being stored) on the government authority computer system 12 and if no vehicle shows up at the particular location on electronic storage 32 or from data from computer system 12, an alarm may be generated since either the vehicle at the particular location detected by the monitoring means either has an inoperative GPS receiver and/or wireless transmitter or the vehicle has failed to register, which may be of even greater concern. This may indicate that the person operating the vehicle may have intended to avoid the system, getting a vehicle into the monitored area without an operating GPS receiver and wireless transmitter, registered as required.

In achieving the advantages of the present invention, law enforcement, emergency responders and other authorized users 34 may request information from electronic storage sub-system 32, this request being inputted via line 36. This request may be made by any suitable means including a wireless communication from a law enforcement vehicle such as a police car. A law enforcement office may make a request via a wireless network, a landline or other suitable communication system. The request may be made by voice and may include voice recognition circuitry or software, by computer using a graphical user interface or keyboard or any other suitable means or form. Authorized users may also include emergency responders either from an office location or at the site of an emergency via all of the various communication networks. Other authorized users may also access the system such as government agencies doing studies on the usage rate of various roads. These requests may request the number of vehicles passing a point in a particular direction over a specified period of time. Other authorized users may also access the data via various communication modalities. Other requests such as from a law enforcement office could include identification of all vehicles, in a particular area at a particular time. The electronic storage subsystem 32 may store in addition to the vehicle identification code, time and location information other information about each vehicle identified by its vehicle identification code and its users, such as the make and type of automobile, the owner, registered users of the vehicle and other information which may be helpful to law enforcement and others.

Electronic storage sub-system 32 would process the request and if it was from a valid authorized user having a proper authorized user identification code, the data could be sent via line 38 which may also include various communication modalities including landlines, wireless networks, satellite networks and other communication systems. The data output in response to a request sent on line 38 may include various information including, but not limited to, the vehicle identification code, license plate number, information about the registrant and the location data. This data may preferably be provided such that it may be displayed on a monitor showing the aforesaid information as well as the location of the vehicle on a map of the area in which the vehicle is located. However, other various ways of transmitting this information may be utilized including voice, either by personnel or by voice generation circuitry, or information may be provided in text form.

Figure 2:
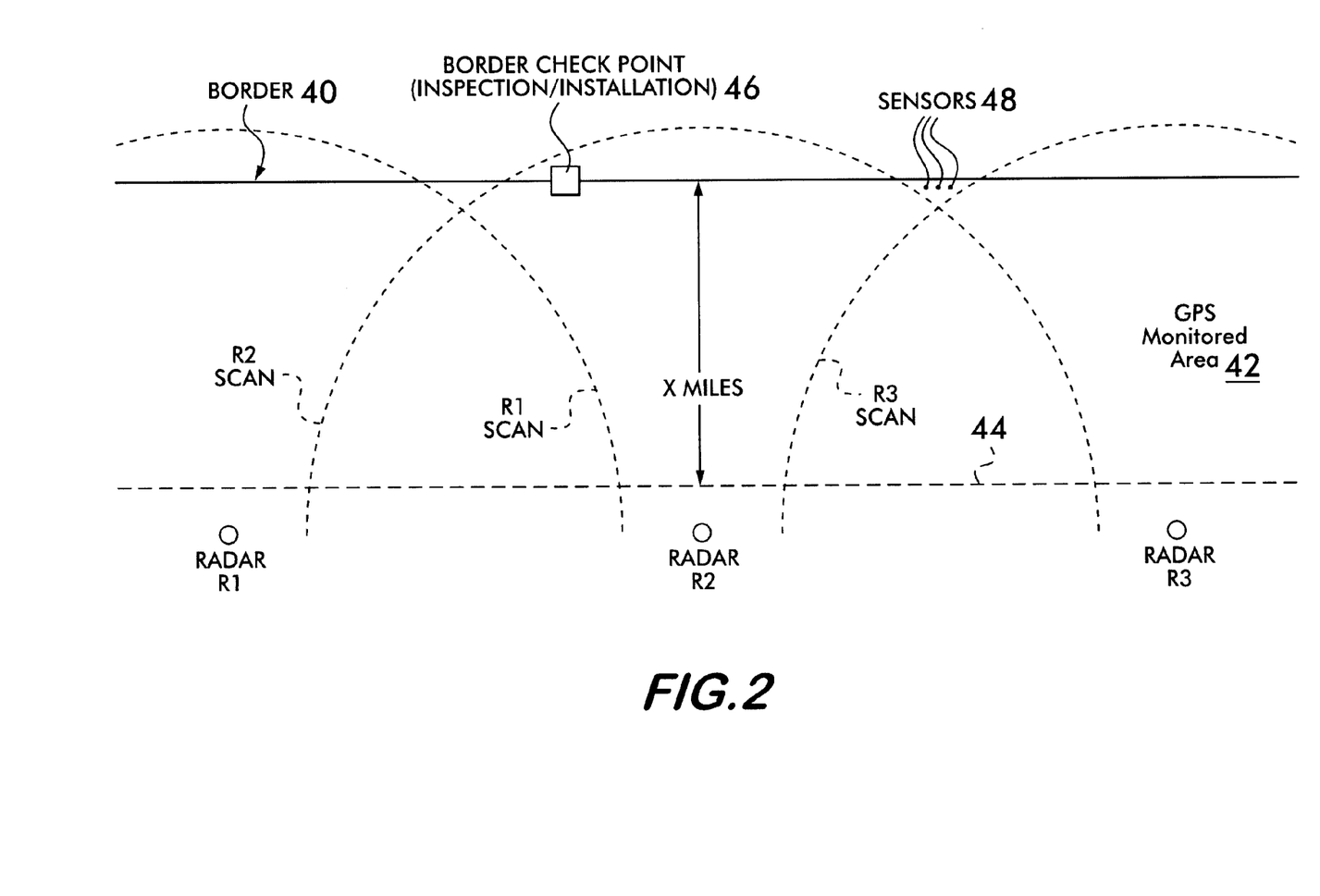
FIG. 2 is a schematic diagram of a limited jurisdictional area or GPS monitored area in the form of a strip along a border showing monitoring means in the form of radar and sensors located within the area.

Referring now to FIG. 2, there is shown a border 40 and a limited jurisdiction area referred to therein as the GPS monitored area 42 which is defined as a strip or area of land, which may include rivers and lakes and the like, between border 40 and dotted line 44 which may be selected as desired. Dotted line 44 may be X miles from border 40, and this may be any suitable distance including a fraction of a mile up to 100 miles or more. Dotted line 44 need not be a straight line as drawn in FIG. 2, but may take any desired shape or form. The GPS monitored area of 42 may be the jurisdiction or it may be a more intensely monitored partial area of a jurisdiction. In other words, a whole state such as New Mexico or Arizona may be a jurisdiction wherein all vehicles in the jurisdiction are tracked via the GPS receiver and wireless transmitter and a 20 mile strip along the border of Mexico may be more intensely monitored having monitoring means for detecting vehicles in the area. Alternatively, GPS monitored area 42 or strip of land or the like along the border may comprise the entire jurisdiction in which vehicles are required to have GPS receivers and wireless transmitters for use in the system. There is also indicated in FIG. 2 a border check point with an inspection/installation facility 46 which is at an established and authorized border crossing point. Inspection/installation facility 46 may be substantially similar to inspection/installation facility 24 as described with respect to FIG. 1.

Continuing to refer to FIG. 2, there is provided an additional security enhancement wherein there is at least some cross checking that vehicles moving about in a GPS monitored area are in fact registered and are equipped with operating GPS receivers and wireless transmitters and connected into the government authority computer system 12. FIG. 2 illustrates some examples of monitoring means for monitoring vehicles by electronic means in a predetermined area and determining their location. The monitoring means may be various monitoring means such as radar unit R1, radar unit R2 and radar unit R3. There may be more or less than three radar units. Radar units R1, R2 and R3 may have rotating antenna which have a scan area as indicated by scans, R1 SCAN, R2 SCAN and R3 SCAN, respectively. These may in part be a partially overlapping to insure better coverage of the area and/or as a design requirement. The monitoring means may also include sensors 48. Although only three sensors 48 are illustrated in FIG. 2, it is understood that there may be wide spread use of sensors distributed throughout the GPS monitored area 42. Sensors 48 may be various types of sensors including sensors embedded in roadways which sense vehicles passing over them by their tires contacting the sensors, ultra sound sensors, laser sensors or any other suitable sensor mounted on structures along the roadways such as poles, bridges and other structures. These sensors could detect moving vehicles. The monitoring means in the form of the radar scans and the other sensors produce output signal information in the form of that a vehicle and preferably a moving vehicle is detected at a particular position or location within the GPS monitored area 42 at a specific time. In the case of sensors, the sensors would be located at known positions within the GPS monitored area, identification of the sensor (with its known position) and the fact that a vehicle passed a point where the sensor is located at a particular time would provide the necessary information. In the case of radar scans, the detection of a vehicle at a particular azimuth with respect to the radar and the distance or range from the radar would determine the vehicles position within the GPS monitored area.

Data from the monitors is fed via line 50 on FIG. 1 to a comparator 52, or other circuitry or software which performs the same function, also shown on FIG. 1. Comparator 52, compares data received from the electronic storage 32 of location of all vehicles for the last period of time via line 54. This would include position or location information at a particular time. If the monitors such as the radar and other sensors 48 detect a vehicle at a particular location at the particular time and no vehicle is recorded on electronic storage unit 32 at that location (with a GPS receiver and wireless transmitter operable thereon) for the particular time then apparently a vehicle is within the GPS monitored area which either does not have an operating GPS receiver and wireless transmitter or it is not currently registered in the system. As soon as comparator 52 determines that a vehicle has been detected at a particular location and that vehicle is not registering by being recorded on electronic storage unit 32, an unregistered vehicle alarm is energized as illustrated by alarm box 56 in FIG. 1. In other words, comparator 52 compares data received from the radar scans and other sensors in the form of a vehicle having been detected, preferably a moving vehicle, at a particular time and location within the GPS monitored area and compares that information with the information being stored or recorded in real time on electronic storage means 32 which is storing in real time the vehicle identification code and location information for all vehicles in the jurisdiction. Comparator 52 sends a signal to activate unregistered vehicle alarm 56 when it is detected that although the monitoring means detect a moving vehicle in the area, no such vehicle is being recorded on electronic storage unit 32 as being present at that location within the GPS monitored area 42. Comparator 52 compares the digital data representing location at a specific time as received from the monitoring means with that being stored in electronic storage unit 32. This may be a software, hard wired or any other form of data comparison method. Comparator 52 and alarm 56 although indicated in FIG. 1 as being outside of the government computer 12, it may be located within the government computer system 12. As with all components, these may be physically spaced in various locations and electronically linked.

Figure 3:
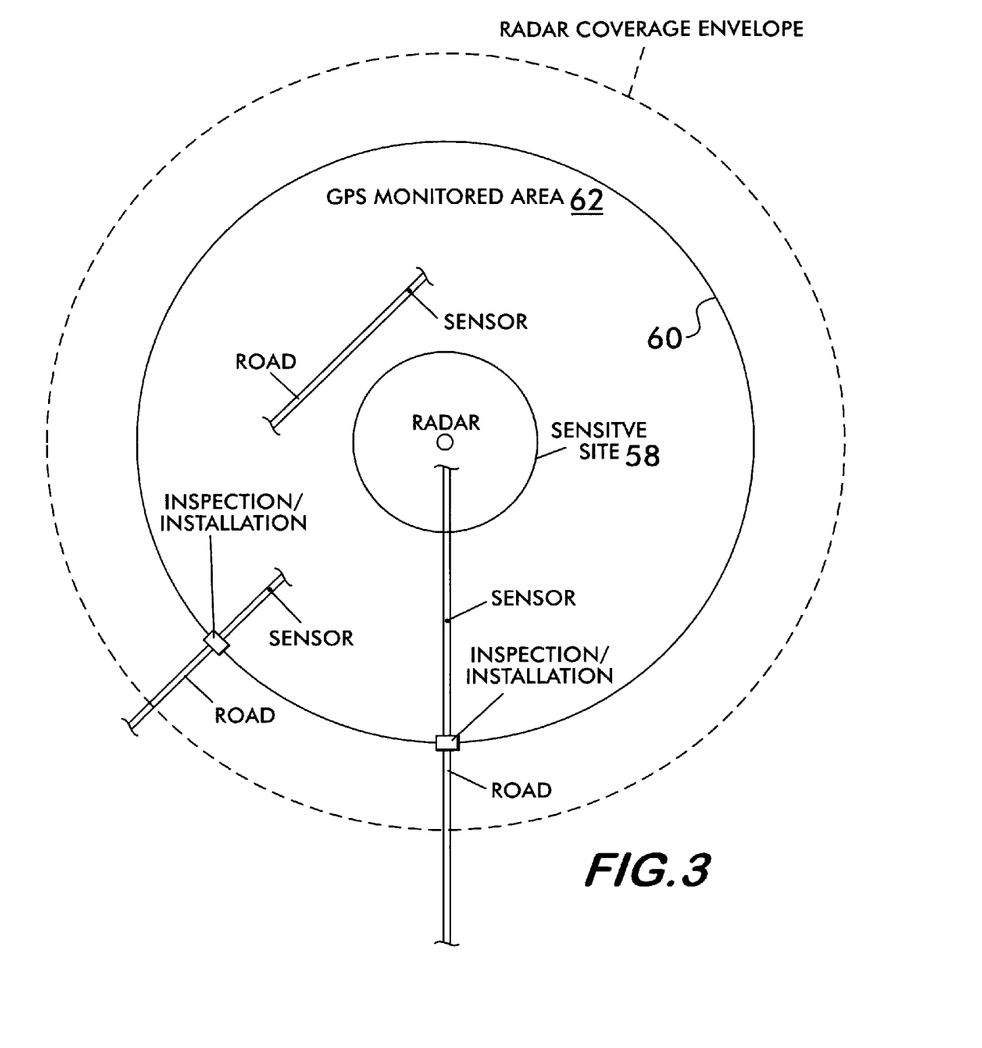
FIG. 3 is a schematic diagram of a sensitive site which may be a nuclear power plant or other sensitive site within a limited jurisdictional area in the form of an area which may be defined by an area surrounding the sensitive site showing monitoring means in the form of sensors and radar.

FIG. 3 illustrates a similar jurisdiction wherein jurisdiction is defined as an area around a sensitive site. FIG. 3 illustrates a radar which may be mounted at the center of the sensitive site and has a radar coverage envelope as indicated which includes at least all of the GPS monitored area 62. The GPS monitored area 62 which surrounds sensitive site 58 is defined by line 60. The GPS monitored area 62 is defined as all of the area within line 60. Line 60 is illustrated as being a circle but it may take other shapes as discussed above.

Within the GPS monitored area 62 there may be various roads as indicated with sensors located in and/or along the roads. There may be also inspection/installation stations for the temporary (or permanent) installation of GPS receivers with wireless transmitters for vehicles which are typically temporarily entering the GPS monitored area 62. These inspection/installation stations would communicate with the government authority computer system to usually temporarily install a GPS receiver and wireless transmitter and make sure that it is operating properly as previously described. The monitors in the form of radar and sensors located in GPS monitored area 62 would also provide location or position information at particular times of vehicles, preferably moving vehicles, within the GPS monitored area 62 via line 50 to comparator 52. This information that a vehicle is located at a particular location within the GPS monitored area 62 would be compared by comparator 52 with information being stored in electronic storage means 32 for that particular time. Again, if there were not a match, that is that information on the electronic storage unit 32 did not reflect a vehicle at that location within GPS monitored area 62 at the particular time, an alarm 56 would be activated. This alarm 56 may referred to as an unregistered vehicle alarm.

In accordance with the method of the present invention, the method includes the steps of inputting into a computer one of a plurality of applications for registration of a vehicle in a jurisdiction. Preferably, all or substantially all of the vehicles in a jurisdiction would be registered. However, as described above, the method includes a system wherein only all vehicles entering a jurisdiction at a border point may be required to register and have a GPS transmitter and receiver installed. Alternatively, only vehicles manufactured with a GPS receiver and wireless transmitter already installed may comprise the system, particularly as a phase in system. Any combination of the foregoing may be used to practice the invention.

The method includes the step of processing by the computer the application and notifying an applicant to present or take the vehicle for which registration was applied to an inspection/installation facility. The method further includes the step of notifying or communicating with at least one of a plurality of vehicle/installation facilities regarding a vehicle identification code for the registration applied for vehicle. The notifying step of notifying at least one of a plurality of vehicle installation facilities would include at least notifying the inspection/installation facility at the border point from which the application came in the case of a system limited to border points and/or notifying at least the new vehicle dealership where a new vehicle with a GPS receiver and wireless transmitter has been installed at the time of manufacture. The method further includes a step of inputting data into the computer from an inspection/installation facility when a GPS receiver and a wireless transmitter have been installed on the vehicle and are capable of transmitting vehicle identification code and location information for the vehicle. The method includes the steps of providing a memory in the computer for storing data relating to the location of said vehicle identification code and storing in the memory location data for the vehicle identification code for a predetermined period of time. Further, the method includes inputting selectively a request for vehicle location information for a particular time or times from an authorized user. The method further includes the step of processing inputted request for information and providing a response to the authorized user in response to the request and the step of repeating the inputting of an application, processing of the application, notifying of or communicating with respect to a vehicle identification code to or with inspection/installation facilities, inputting of data from the inspection/installation facilities when the GPS receiver and wireless transmitter are installed and or at least operating properly and storing in memory location and time data for the vehicle identification code.

The method of the present invention further includes a method of at least spot checking that vehicles within the GPS monitored area are in fact equipped with operating GPS receivers and wireless transmitters. This method includes the monitoring of vehicles by electronic sensor means in a predetermined area and determining their location at a particular time. The method further includes comparing by a comparator the location information from the vehicle electronic monitoring means at the particular time with information from the means for storing the vehicle information code and related location information at the same particular time and generating an unregistered vehicle alarm signal if based on the stored (this includes VIC and location information in the process of being stored) location information no vehicle with a GPS receiver is at the location specified by the vehicle monitoring means.

The present invention may be embodied in other specific forms without departing from the spirit or essential attributes thereof and, accordingly, reference should be made to the appended claims, rather than to the foregoing specification as indicating the scope of the invention.

I claim:

1. A computer system, comprising;
    means for inputting into a computer an application for registration for substantially each vehicle entering a jurisdiction at a border point;
    means for processing each said application for which registration was applied and as a result of processing said application, notifying each applicant to present or take each vehicle for which registration was applied to an inspection/installation facility;
    means for communicating with at least one of a plurality of vehicle inspection/installation facilities, including at least one at said border point, of a vehicle identification code for each vehicle for which registration was applied;
    means for inputting data from an inspection/installation facility that a GPS receiver with a wireless transmitter has been installed on and is operable on said vehicle for which registration was applied;
    means for receiving from each said wireless transmitter information in the form of a vehicle identification code and current location information;
    means for storing said vehicle information code and related location information for each instant in time in substantially real time for a predetermined period of time;
    means for inputting selectively a request for vehicle location information for one or more particular times from an authorized user; and,
    means for processing said inputted request for information and providing a response to said authorized user in response to said request.

2. A computer system in accordance with claim 1 wherein said means for inputting into a computer applications includes means for inputting an application for each vehicle required to be registered in a jurisdiction.

3. A computer system in accordance with claim 1 wherein said means for inputting into a computer an application for registration for substantially each vehicle entering a jurisdiction at a border point includes means for inputting an application for temporary registration of a vehicle entering at a border point.

4. A computer controlled system in accordance with claim 2 further including:
    means for monitoring vehicles in a predetermined area and determining their location;
    means for comparing said location information from said vehicle monitoring means with information from said means for storing said vehicle information code and related location information; and,
    said comparing means generating an unregistered vehicle alarm signal if, based on the stored location information, no vehicle with a GPS receiver is at the location specified by said vehicle monitoring means.

5. A computer controlled system in accordance with claim 4 wherein said vehicle monitoring means is radar.

6. A computer controlled system in accordance with claim 5 wherein said monitoring means generates a location signal based on azimuth and distance information of the vehicle with respect to the radar.

7. A computer controlled system in accordance with claim 4 wherein said monitoring means includes sensors located along roadways.

8. A computer controlled system in accordance with claim 7 wherein said monitoring means includes a sensor located on a bridge.

9. A computer controlled system in accordance with claim 7 wherein said monitoring means includes a sensor located on poles at known locations along roadways.

10. A computer controlled system in accordance with claim 4 wherein said monitoring means includes radar for sensing moving vehicles.

11. A computer system in accordance with claim 1 wherein said means for selectively inputting a request for vehicle location information from an authorized user includes a request for information about identity of vehicles in a particular location at a particular time.

12. A computer system in accordance with claim 1 wherein said means for selectively inputting a request from an authorized user includes a request for information about a particular vehicle.

13. A computer system in accordance with claim 1 wherein said request includes requests for information about vehicles in a particular area at a particular time.

14. A computer system in accordance with claim 1 wherein said request includes information with respect to the number of vehicles passing a point in a particular direction over a selected period of time.

15. A computer system in accordance with claim 1 wherein an alarm detection system detects a loss of signal from a transmitter of said vehicle.

16. A computer system in accordance with claim 1 wherein said computer system includes an alarm system for detecting a signal indicating tampering with a GPS receiver and/or transmitter located on said vehicle.

17. A method, comprising the steps of:
    inputting into a computer one of a plurality of applications for registration of a vehicle entering a jurisdiction at a border point;
    processing by said computer said application and determining a vehicle identification code and as a result of processing said application, notifying each applicant to present or take each vehicle for which registration was applied to an inspection/installation facility;
    communicating with at least one of a plurality of vehicle inspection/installation facilities, including at least one at said border point, regarding a vehicle identification code for said registration applied for vehicle;
    inputting data into said computer from an inspection/installation facility when a GPS receiver and wireless transmitter have been installed on and is operable on said vehicle for which registration was applied, and said transmitter is transmitting vehicle identification code and location information;
    providing a memory in said computer for storing data relating to the location of said vehicle and vehicle identification code information for each instant of time;
    storing in said memory, time and location data for said vehicle identification code in at least substantially real time for a predetermined period of time;
    inputting selectively into said computer a request for vehicle location information for a particular time or times from an authorized user, processing by said computer said inputted request for information and providing a response to the authorized user in response to said request; and, repeating the aforesaid steps of inputting an application, processing, communicating, inputting data, and storing for substantially all vehicles entering a jurisdiction at least one border point.

18. A method in accordance with claim 17 wherein said step of inputting into a computer one of a plurality of applications for registration of a vehicle entering a jurisdiction at a border point includes inputting an application for temporary registration of a vehicle at a border point.

19. A method in accordance with claim 17 wherein said step for inputting into a computer one of a plurality of applications includes the step of inputting an application for each vehicle required to be registered in a jurisdiction.

20. A method in accordance with claim 19 further including the steps of:

monitoring vehicles by electronic means in a predetermined area and determining their location;

comparing by said computer said location information from said vehicle electronic monitoring means with information from said means for storing said vehicle information code and related location information; and, generating by said computer an unregistered vehicle alarm signal if, based on the stored location information, no vehicle with a GPS receiver is at the location specified by said vehicle monitoring means.

21. A method in accordance with claim 20 wherein said electronic vehicle monitoring means is radar.

22. A method in accordance with claim 21 wherein said monitoring means generates a location signal based on azimuth and distance information of the vehicle with respect to the radar.

23. A method in accordance with claim 20 wherein said monitoring means includes sensors located along roadways.

24. A method in accordance with claim 23 wherein said monitoring means includes a sensor located on a bridge.

25. A method in accordance with claim 23 wherein said monitoring means includes a sensor located on poles at known locations along roadways.

26. A method in accordance with claim 20 wherein said monitoring means includes radar for sensing moving vehicles.

27. A method in accordance with claim 17 wherein said step of selectively inputting a request for vehicle location information from an authorized user includes a request for information about identity of vehicles in a particular location at a particular time.

28. A method in accordance with claim 17 wherein authorized users include law enforcement and emergency services personnel.

29. A method in accordance with claim 17 wherein said step of inputting selectively a request for vehicle location information includes a request for other information relating to the vehicle or its registrant.

30. A method in accordance with claim 17 wherein said step of inputting selectively a request for vehicle location information includes a request for identification of vehicles located in a particular area at a particular time.

31. A method in accordance with claim 17 wherein said step of inputting selectively a request for vehicle location information includes a request for the number of vehicles passing a particular point in a particular direction during a selected period of time.

32. A method in accordance with claim 17 wherein said method includes the step of energizing an alarm as a result of the detection of a loss of signal from said vehicle transmitter.

33. A method in accordance with claim 17 including the step of detecting a tampering signal generated as a result of tampering with said GPS receiver and/or wireless transmitter located on said vehicle and energizing an alarm.

34. A computer system, comprising;

means for inputting into a computer an application for registration for substantially each vehicle entering a jurisdiction at a border point;

means for processing each said application and notifying an applicant of said application to present each vehicle for which registration was applied to a specified inspection/installation facility;

means for notifying at least said specified one of a plurality of vehicle inspection/installation facilities of a vehicle identification code for each vehicle for which registration was applied for and approved;

means for inputting data from an inspection/installation facility when a GPS receiver with a wireless transmitter has been installed on said vehicle for which registration was applied;

means for receiving from each said wireless transmitter information in the form of a vehicle identification code and current location information;

means for storing said vehicle information code and related location information for each instant in time in substantially real time for a predetermined period of time;

means for inputting selectively a request for vehicle location information for one or more particular times from an authorized user; and, means for processing said inputted request for information and providing a response to said authorized user in response to said request.

35. A computer system in accordance with claim 34 wherein said means for selectively inputting a request from an authorized user includes a request for information about a particular vehicle.

36. A computer system in accordance with claim 34 wherein said request includes requests for information about vehicles in a particular area at a particular time.

37. A computer system in accordance with claim 34 wherein an alarm detection system detects a loss of signal from a transmitter of said vehicle.

38. A computer system in accordance with claim 34 wherein said computer system includes an alarm system for detecting a signal indicating tampering with a GPS receiver and/or transmitter located on said vehicle.

39. A method, comprising the steps of:

inputting into a computer one of a plurality of applications for registration of a vehicle entering a jurisdiction at a border point;

processing by said computer said application and notifying an applicant of said application to present the vehicle for which registration was applied to a specified inspection/installation facility;

notifying at least said specified one of a plurality of vehicle inspection/installation facilities of a vehicle identification code for said registration applied for vehicle;

inputting data into said computer from an inspection/installation facility when a GPS receiver and wireless transmitter have been installed on said vehicle for which registration was applied for and said transmitter is transmitting vehicle identification code and location information;

providing a memory in said computer for storing data relating to the location of said vehicle identification code;

storing in said memory time and location data for said vehicle identification code in at least substantially real time for a predetermined period of time;

inputting into said computer selectively a request for vehicle location information for a particular time or times from an authorized user;

processing by said computer said inputted request for information and providing a response to the authorized user in response to said request; and repeating the aforesaid steps of inputting an application, processing, notifying, inputting data, and storing for substantially all vehicles entering said jurisdiction at a border point.

40. A method in accordance with claim 39 wherein said authorized users include law enforcement and emergency services personnel.

41. A method in accordance with claim 39 wherein said step of inputting selectively a request for vehicle location information includes a request for other information relating to the vehicle or its registrant.

42. A method in accordance with claim 39 wherein said step of inputting selectively a request for vehicle location information includes a request for identification of vehicles located in a particular area at a particular time.

43. A method in accordance with claim 39 wherein said method includes the step of energizing an alarm as a result of the detection of a loss of signal from said vehicle transmitter.

44. A method in accordance with claim 39 including the step of detecting a tampering signal generated as a result of tampering with said GPS receiver and/or wireless transmitter located on said vehicle and energizing an alarm.

45. A computer controlled system, comprising:
means for inputting into a computer an application for registration for substantially each vehicle required to be registered in a jurisdiction;
means for processing each said application to determine whether it will be approved and for determination of a vehicle identification code and as a result of processing said application, notifying each applicant to present or take each vehicle for which registration was applied to an inspection/installation facility;
means for communicating with at least one vehicle inspection/installation facility regarding a vehicle identification code for each vehicle for which registration was applied;
means for verifying that a GPS receiver with a wireless transmitter has been installed and is operable on said vehicle for which registration was applied;
means for receiving from each said wireless transmitter information in the form of a vehicle identification code and current location information;
means for storing said vehicle information code and related location information for each instant in time in substantially real time for a predetermined period of time;
means for inputting selectively a request for vehicle location information for one or more particular times from an authorized user;
means for processing said inputted request for information and providing a response to said authorized user in response to said request;
means for monitoring vehicles in a predetermined area and determining their location at a particular time;
means for comparing said location information from said vehicle monitoring means with information from said means for storing said vehicle information code and related location information at said particular time; and,
said comparing means generating an alarm signal if information from said means for storing shows no vehicle with a GPS receiver is at the location specified by said vehicle monitoring means at said particular time.

46. A computer controlled system in accordance with claim 45 wherein said vehicle monitoring means is radar.

47. A computer controlled system in accordance with claim 46 wherein said monitoring means generates a location signal based on azimuth and distance information of the vehicle with respect to the radar.

48. A computer controlled system in accordance with claim 45 wherein said monitoring means includes sensors located along roadways.

49. A computer controlled system in accordance with claim 48 wherein said monitoring means includes a sensor located on a bridge.

50. A computer controlled system in accordance with claim 48 wherein said monitoring means includes a sensor located on poles at known locations along roadways.

51. A computer controlled system in accordance with claim 45 wherein said monitoring means includes radar for sensing moving vehicles.

52. A computer system, comprising;
means for inputting into a computer an application for registration for substantially each new vehicle being placed in service in a jurisdiction, said application including a VIN and a certification that a GPS receiver and wireless transmitter were installed on the new vehicle at the time of manufacture;
means for processing each said application for which registration was applied and as a result of processing said application, notifying each applicant to present or take each vehicle for which registration was applied to an inspection/installation facility;
means for communicating with at least one of a plurality of vehicle inspection/installation facilities, including at least one at a location of applicant, of a vehicle identification code for each vehicle for which registration was applied;
means for inputting data from an inspection/installation facility that the GPS receiver with a wireless transmitter is operable on said vehicle for which registration was applied;
means for receiving from each said wireless transmitter information in the form of a vehicle identification code and current location information;
means for storing said vehicle information code and related location information for each instant in time in substantially real time for a predetermined period of time;
means for inputting selectively a request for vehicle location information for one or more particular times from an authorized user; and
means for processing said inputted request for information and providing a response to said authorized user in response to said request.

53. A computer system in accordance with claim 52 which includes:
means for inputting into a computer an application for registration for substantially each vehicle entering a jurisdiction at a border point;
means for processing each said application for which registration was applied;
means for communicating with at least one of a plurality of vehicle inspection/installation facilities, including at least one at said border point, of a vehicle identification code for each vehicle for which registration was applied; and means for inputting data from an inspection/installation facility that a GPS receiver with a wireless transmitter has been installed on and is operable on said vehicle for which registration was applied.

54. A computer system in accordance with claim 53 which includes:

means for inputting an application for each vehicle required to be registered in a jurisdiction.

55. A computer system in accordance with claim 54 which includes:

monitoring means for sensing the location of a vehicle within said jurisdiction at a particular time;

comparator means for comparing information about the location of vehicle at said particular time with location information on said means for storing at said particular time; and means for generating an alarm if said location information from said means for storing does not show a vehicle at the location indicated by information from said monitoring means at said particular time.

\* \* \* \* \*